March 3, 1964  J. H. GROVER ETAL  3,122,884
ROCKET MOTOR
Filed May 19, 1961  6 Sheets-Sheet 1

INVENTORS
John H. Grover &
James R. MacPherson
BY Martha L. Ross
AGENT

March 3, 1964 J. H. GROVER ETAL 3,122,884
ROCKET MOTOR
Filed May 19, 1961 6 Sheets-Sheet 2

INVENTORS
John H. Grover &
James R. MacPherson

BY Martha L. Ross
AGENT

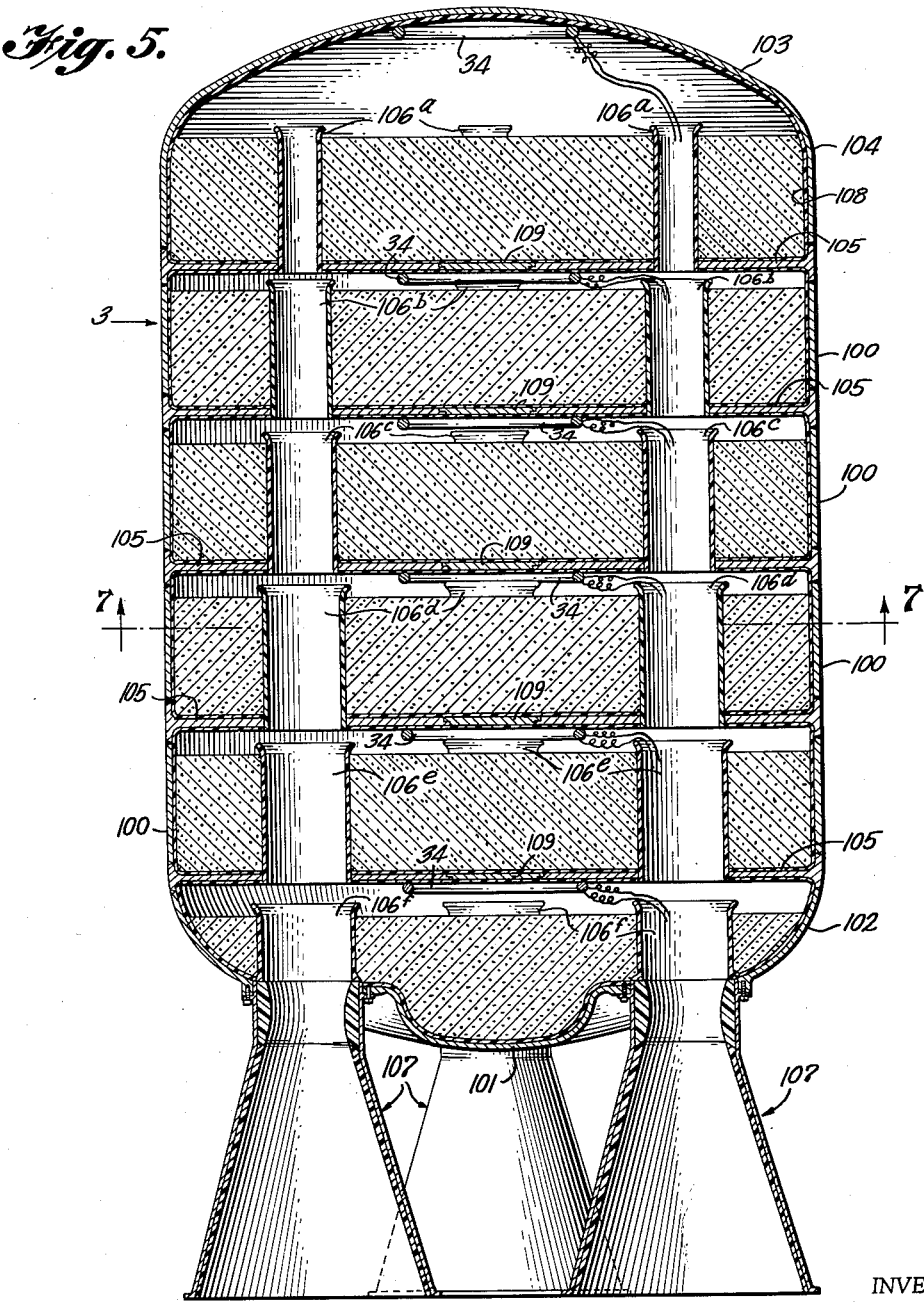

March 3, 1964 J. H. GROVER ETAL 3,122,884
ROCKET MOTOR
Filed May 19, 1961 6 Sheets-Sheet 4

INVENTORS
John H. Grover &
James R. MacPherson
BY Martha L. Ross
AGENT

March 3, 1964 J. H. GROVER ETAL 3,122,884
ROCKET MOTOR
Filed May 19, 1961 6 Sheets-Sheet 5

INVENTORS
John H. Grover &
James R. MacPherson

BY Martha L. Ross
AGENT

March 3, 1964    J. H. GROVER ETAL    3,122,884
ROCKET MOTOR
Filed May 19, 1961    6 Sheets-Sheet 6
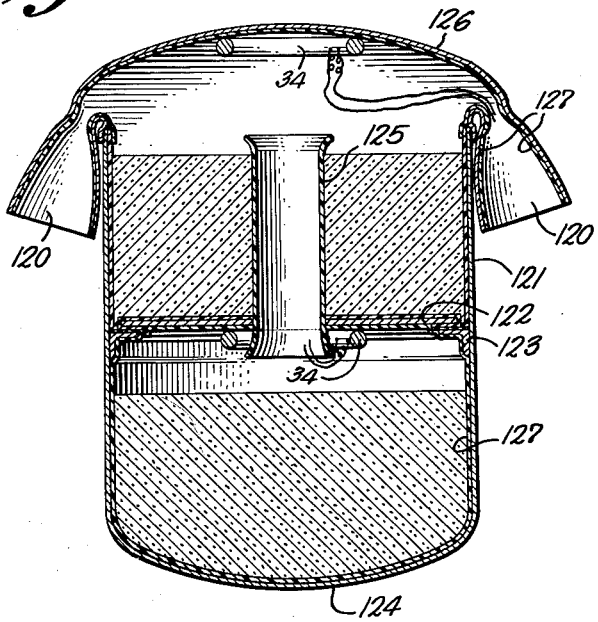
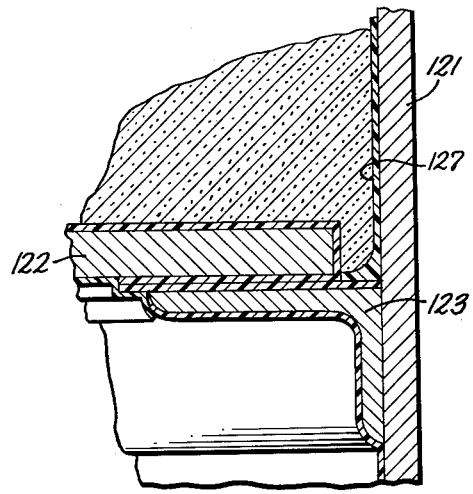
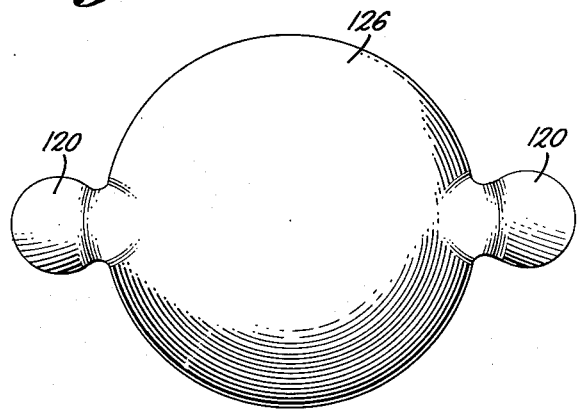
INVENTORS
John H. Grover &
James R. MacPherson
BY Martha L. Ross
AGENT United States Patent Office 3,122,884
Patented Mar. 3, 1964

3,122,884
ROCKET MOTOR
John H. Grover, Washington, D.C., and James R. MacPherson, Falls Church, Va., assignors to Atlantic Research Corporation, Fairfax, Va., a corporation of Virginia
Filed May 19, 1961, Ser. No. 111,396
14 Claims. (Cl. 60—35.6)

This invention relates to new and improved rocket motors. More specifically, it relates to rocket motors designed for burning semi-solid propellants.

Our space and defense programs urgently require rocket boosters having high thrust capability. Liquid propellants can provide such thrust but present serious difficulties such as exceedingly complex storage and feeding requirements, propellant instability, low density and corrosiveness, and lack of standby readiness, since the propellants must generally be loaded into the rocket as close as possible to take-off time.

Solid propellant rockets have important advantages in terms of structural and operational simplicity, stability, high loading density, and standby readiness. They do, however, pose certain problems which become increasingly difficult to solve with increasing size of the grain. Solid propellants, after mixing of the components such as oxidizer, organic fuel binder, high energy additives and the like, must be cast and cured at elevated temperatures and, frequently, under high pressure. This is a hazardous, time-consuming and expensive operation which becomes more and more difficult with increasing web thickness of the grain, since curing must be uniform throughout. Upon cooling, the cured propellant composition sets into a shaped, rigidly-solid mass which must be completely free from even minute cracks or fissures, since such flaws might cause it to shatter under pressure or vibrational stress in the combustion chamber and, thereby, provide large, unscheduled and uncontrollable burning surfaces resulting in explosion of the motor. The cast grains, therefore, must be carefully inspected by X-ray and other means and rejected if imperfections are found. This is still another time-consuming and costly operation, particularly if the rejection rate is considerable. Solid propellants are also sensitive to extremes of ambient temperature. At low ambient temperatures, they tend to become brittle, which can cause fissuring. At high ambient temperatures, they tend to plastic flow which can cause shape distortions and result in undesirable changes in the predesigned burning surface.

Solid propellant grains are generally designed to burn only on a preselected burning surface or surfaces. The others are restricted against burning by the application of an inhibitor coating, which must bond perfectly to the grain surface from the time of application through the burning period of the grain, since separation can cause disastrously increased burning surface area.

Solid propellant grain manufacture is not feasible on-site. The finished grains must be shipped to the loading base or must be loaded into the rocket motors at the production plant prior to shipment. The transportation of large solid grains introduces still another hazard because of possible fissuring or cracking of the solid propellant mass or separation of the inhibiting liner.

Still another limiting feature of solid propellant grains is the fact that, once cast and cured, they are fixed in size and configuration and must be used in the motor for which they have been specifically designed. If the motor is redesigned in size or shape, new grains must generally be made.

Solid propellants are also limited in composition formulation because of the physical property requirements of the cured grain. These requirements make it difficult, and sometimes impossible, to incorporate many additives which would enhance ballistic properties.

There have recently been developed semi-solid monopropellant compositions which, though viscous and of a cohesive, paste-like consistency, are essentially fluid, since they are capable of flow at ordinary temperature under applied pressure and under the pressure of their own weight. Thus they can be pumped into a container where they flow into a continuous mass free from cracks or fissures.

Semi-solid monopropellants possess many of the advantages of solid propellants, such as high density, relatively low heat and shock sensitivity, good stability, storageability for long periods without deterioration, freedom from leakage, and low corrosiveness and toxicity. They also eliminate many of the disadvantages of solid propellants. The semi-solid compositions need only to be mixed in suitable mixing equipment uniformly to distribute the components, such as solid oxidizer and other solid additives in the liquid organic fuel vehicle, and are then ready for loading at the production facility, or for pumping into tank cars for shipping and on-site loading. Thus they eliminate costly casting, curing, inspection for flaws, and the problems inherent in the shipment of solid propellant grains before or after loading into rocket motors. Extremes of ambient temperature are no problem since the semi-solid monopropellant does not embrittle at low temperature and plastic flow is a normal characteristic which is taken into account in its normal mode of use.

Because of their fluidity, the semi-solid monopropellants are not readily amenable to conventional rocket motor loading for most applications requiring an upward trajectory. They pose an additional problem in that burning surface area is limited to the upper surface of the semi-fluid mass. Unlike solid grains, they cannot be perforated or slotted to provide increased burning surface area. For these reasons, they have hitherto been employed to generate high energy gases by continuous extrusion from a storage chamber into a combustion chamber and burning the leading face of the advancing column of monopropellant in the combustion chamber.

The object of this invention is to provide rocket motors powered by the combustion of a semi-solid monopropellant loaded directly into the combustion chamber and especially to provide such rocket motors which can generate very high thrust for boosting large payloads.

Another object is to provide rocket motors which permit the fullest utilization of the advantages inherent in semi-solid monopropellants while solving such problems as the limitation of burning surface area to one end and utilization to produce upward thrust.

Still another object is to provide rocket motors of considerably larger size than has hitherto been possible with solid propellants. Another object is to provide rocket motors at considerably lower delivered cost than is possible with solid propellant motors of equivalent or lesser thrust capacity.

Other objects and advantages will become obvious from the following detailed description and the drawings.

In the drawings:

FIGURE 5 is a vertical longitudinal sectional view through a modified form of the rocket motor;

FIGURE 10 is a longitudinal sectional view through a rocket motor showing another modification;

FIGURE 11 is an enlarged sectional detail of the tray supporting means of FIGURE 10;

FIGURE 12 is a top plan view of the rocket motor shown in FIGURE 10.

Broadly speaking, the rocket motor comprises a cylindrical motor casing which has closure members across its top or forward end and across its bottom or aft end and which is internally divided by one or more transverse partitioning members into a plurality of vertically-tiered receptacles or compartments for receiving semi-solid monopropellant when the motor is in its normal vertical or upright position. Each compartment is filled to a level short of its forward closure with a viscous pool of the monopropellant, which burns on its upper or forward surface. Communication of the compartments with each other and with one or more restricted, rearwardly directed nozzles, for venting the high temperature, high pressure combustion gases out of the motor, is achieved by means of at least one tubular exhaust stack or standpipe, which extends upwardly from each partitioning member to a point short of the upper or forward closure of the compartment and opens through the partition to communicate with the upper or forward portion of the compartment below.

The motor thus divides the total semi-solid propellant load into a plurality of segments, each of which contributes a burning surface area equal to the cross-sectional area of the motor less the relatively small space occupied by the exhaust stack or stacks. This burning area is multiplied by the number of segments to produce a high mass rate of gas generation, which can be tailored to any given motor application by simply increasing or decreasing the number of segments.

The motor design also makes possible boosting in an upward trajectory since the viscous propellant is kept from venting with the combustion gases out of a rearwardly positioned nozzle under accelerative set-back forces by the supporting and restraining action of the partitioning members. The rear closure of the rocket is also designed to provide similar restraining action when it serves as the floor of the rearmost receptacle.

The interior cylindrical wall of the rocket, as is conventional with a solid propellant motor, is lined with suitable insulation. The partitioning members and stacks are similarly insulated. Since the semi-solid propellant, under the pressure of its own weight, flows into and is maintained in intimate contact with the insulated walls, floor and stacks which combine to form the restraining receptacle for the propellant, the inhibitor liner, which must be bonded to similarly positioned surfaces of a solid propellant grain to prevent their ignition, can be dispensed with. This not only eliminates a costly, time-consuming operation, but the hazards attendant upon inhibitor failure.

Figure 1:
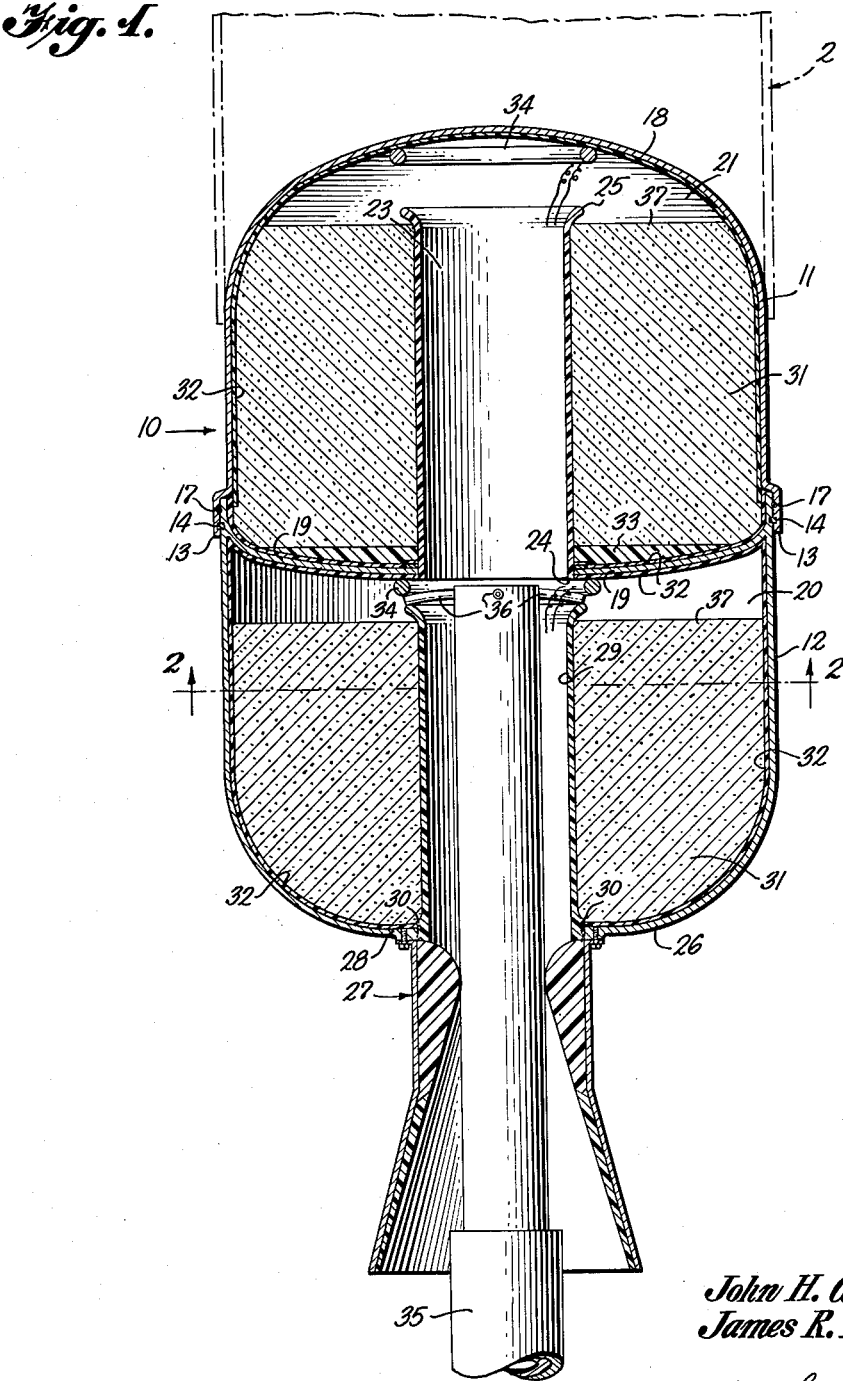
FIGURE 1 is a vertical longitudinal sectional view through one form of the rocket motor of the invention.
Figure 2:
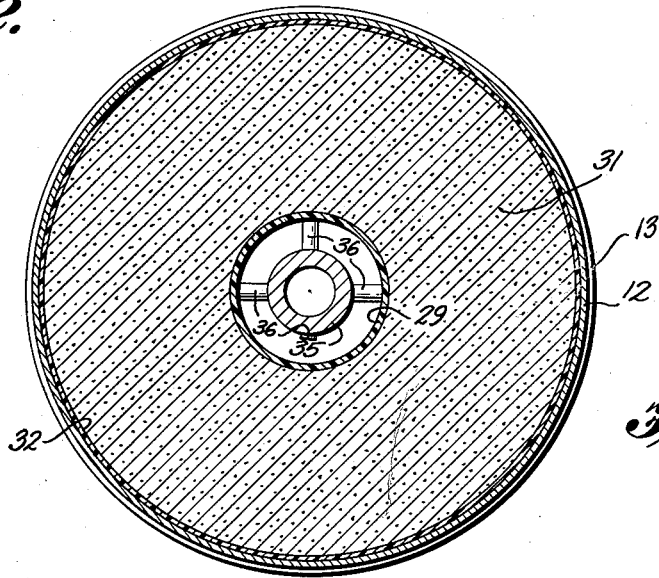
FIGURE 2 is a transverse sectional view taken along line 2—2 of FIGURE 1.
Figure 4:
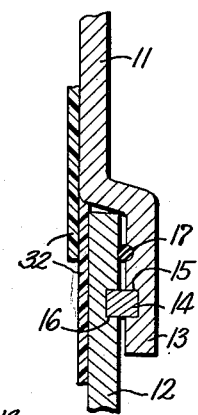
FIGURE 4 is an enlarged fragmentary sectional detailed view showing the motor casing joint.
Figure 3:
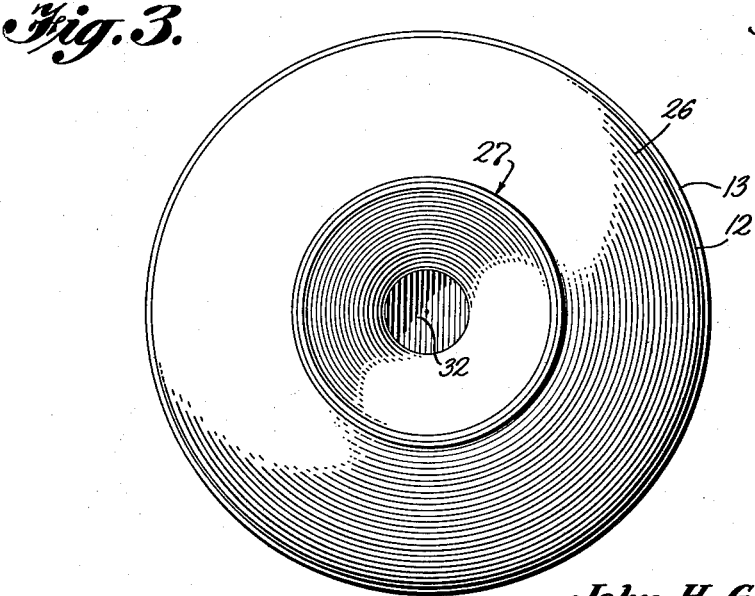
FIGURE 3 is a bottom plan view of the rocket motor shown in FIGURE 1 with the loading boom omitted.

Reverting now to the drawings, FIGURE 1 shows diagrammatically a two-chambered rocket motor illustrative of the invention, in which cylindrical motor casing 10 consists of forward and rearward annular segments 11 and 12, which are interlocked by inserting the forward end of segment 11 inside of circumferential flange 13, which forms the rearward end of segment 11 and inserting Ortman key 14, which serves as the locking means, into juxtaposed annular grooves 15 and 16, as shown in detail FIGURE 4. O-ring 17 serves as a sealing member. The forward end of cylindrical segment 11 is provided with a forward closure wall 18 which can be integral as shown or a separate capping member which is locked in place during assembly of the motor.

Transverse tray or partitioning member 19 divides the interior of the cylindrical casing into two vertically positioned compartments 20 and 21. Tubular exhaust stack 23 opens through tray 19 at 24 so that it is in open communication with the forward or upper portion of rear or lower compartment 20, and extends upwardly from the tray to a point spaced rearwardly of forward closure 18. The forward lip 25 of stack 23 is preferably outwardly flared as shown to provide good entry characteristics for the combustion gases.

Rear or lower compartment 20 is provided with rear closure member or wall 26, which can be integral with cylindrical motor casing segment 12 as shown, or a separate closure unit joined during motor assembly. A conventional, suitably insulated, restricted, rearwardly-directed nozzle member 27 is attached to the rear closure member 26, as shown, in any suitable manner, as by bolting through nozzle flange 28. Exhaust stack 29, which is substantially similar to stack 23, extends forwardly from rear closure member 26 to which it is attached in suitable manner, as by adhesive bonding at 30, to a point spaced rearwardly from the top of chamber 20 defined by transverse tray 19, and communicates rearwardly directly with venting nozzle 27. Tubular stack 29 also provides, in combination with rear wall 26 and side motor wall 12, a receptacle for receiving semi-solid monopropellant 31, which prevents any flow of the monopropellant out the rear nozzle when the motor is in upright position or moving in an upward trajectory.

All of the interior surfaces of the motor walls and partitioning member are insulated with suitable insulating material 32. The exhaust stacks 23 and 29 can be made of a metal shell insulated on both surfaces or of a rigid insulating material throughout as shown. The dished tray 19 can also be provided, if desired, with an additional upper layer 33 made of an insulating material, or inert plastic filler, and having an upper plane surface to reduce tail-off. Conventional igniters 34, such as an electrically initiated pyrogen igniter having a consumable case, are appropriately mounted in each chamber, as shown diagrammatically. The electrical lead wires can be attached to a source of electric current (not shown) outside the motor through the nozzle and communicating exhaust stacks.

A second stage motor or payload shown partially and diagrammatically as 2, can be attached to the forward end of the booster motor in any suitable manner.

The semi-solid monopropellant 31 can be loaded into each of the propellent chambers in any of several ways, such as through a port hole (not shown) opening in the motor wall casing at a level just forward of the bottom of the receptacle, which is sealed after loading is completed, or by means of a telescopic loading boom 35 shown diagrammatically in FIGURE 1. The boom is inserted upwardly through the nozzle and communicating stack to just above the upper rim of the stack. Pressure-actuated telescopic nozzles 36 in the loading boom head are projected radially over the lip of the stack to deliver the monopropellant, which is pumped up through the loading boom from a tank car or below-ground storage reservoir, not shown. Pumping of the viscous monopropellant can be facilitated, if desired, by heating it to any desired temperature below its ignition temperature prior to loading to reduce its viscosity. This expedient not only reduces loading time, but also reduces the time for the material to flow within the motor chamber into a continuous mass having a level surface, and minimizes the formation of entrapped air bubbles, which might otherwise require special treatment, such as a vibrating or vacuum means to remove. After cooling in the chamber, the monopropellant is still semi-solid but of higher viscosity than in the heated state.

After the lower chamber is loaded, the nozzles are retracted and the boom raised through the upper stack to load the upper chamber. The depth of monopropellant introduced into each chamber is, of course, limited by the height of the exhaust stack.

The top surface 37 of each pool of semi-solid monopropellant provides an ignition surface which burns downward in the direction opposite to motor thrust. After ignition, the burning monopropellant produces high temperature, high pressure combustion gases which vent through the exhaust stacks and the rearwardly-directed nozzle to produce upward thrust.

Figure 6:
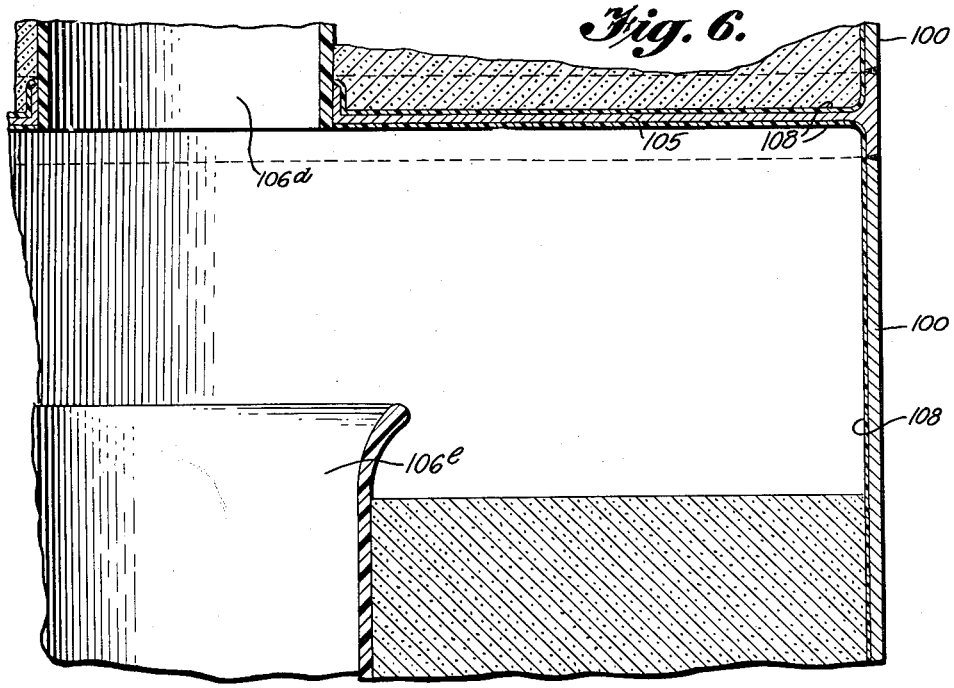
FIGURE 6 is an enlarged detailed view showing the welded bonds joining the partitioning member and cylindrical motor casing segments.
Figure 7:
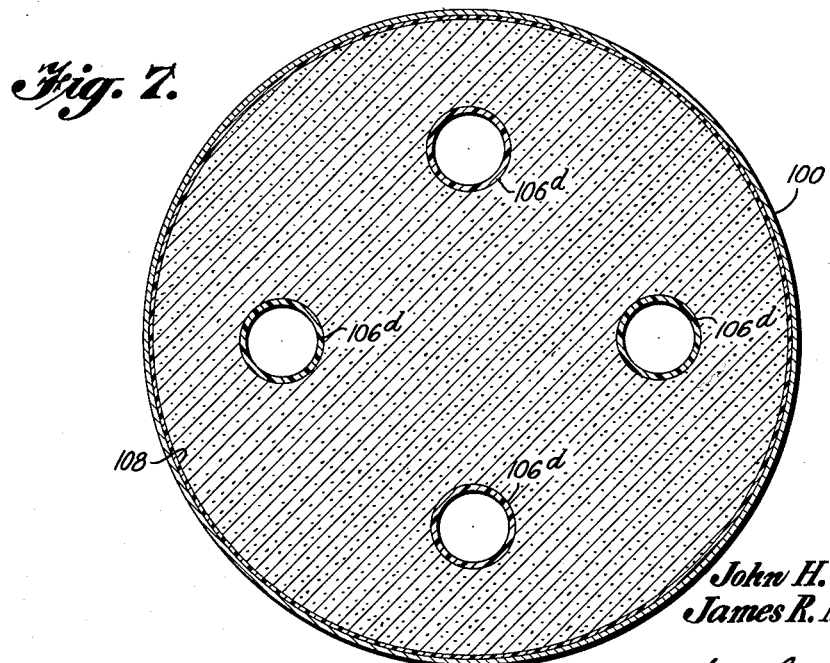
FIGURE 7 is a transverse cross section taken along line 7—7 of FIGURE 5.
Figure 8:
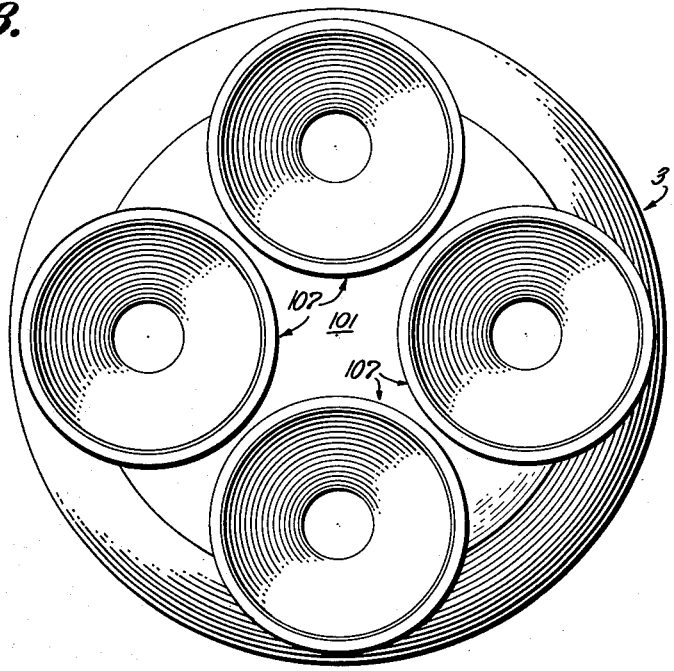
FIGURE 8 is a bottom plan view of the motor of FIGURE 5.

The rocket motor of this invention can be increased in thrust capability by increasing its diameter and by adding vertical compartments for receiving additional pools of the viscous monopropellant. FIGURE 5 shows such a motor of greatly increased size and capacity. Motor 3 is built up vertically of cylindrical motor casing segments 100; an aft closure wall 101 having a forward, curved annular extension 102, the forward lip of which is in mating alignment with the rearward edge of the most rearward casing segment 100; and a forward closure 103 provided with rear annular extension 104, the rear edge of which mates with the forward edge of topmost casing segment 100. Five transverse, partitioning members or trays, 105, flat (as shown) or dished, spaced from each other and the top and bottom motor closures, span the interior diameter of the motor to divide it into six vertically tiered compartments. The motor, in this case, is assembled by welding the circumferential rim of each tray to the rear and forward edges respectively of the next forward and next rearward motor casing segment, as shown in enlarged detail in FIGURE 6. Each tray is provided with four upwardly extending exhaust stacks 106a, 106b, 106c, 106d and 106e, each opening rearwardly into the upper portion of the next rearward compartment, and axially aligned with a stack in an adjacent compartment. The compartment defined by the aft closure 101 is similarly equipped with four axially aligned exhaust stacks 106f, which open rearwardly into four rearwardly-directed, restricted nozzles 107 mounted on dimpled portions of aft closure 101, as shown. The diameter of succeeding sets of exhaust stacks can be increased, as shown, from top to bottom of the motor to provide for the increasing volume of combustion gases combining in an aft direction from the successive compartmental combustion chambers. The use of a plurality of smaller diameter exhaust stacks in each tier instead of a single larger stack is an expedient for increasing the strength of the trays. The trays as shown are in the form of a single integral disc. They can, however, also be conveniently built of several radially mating, wedge-shaped sections. They can also be dished downward for increased strength and fabricated of sandwich structure for minimum weight.

All interior metal surfaces are lined with insulation 108. The stacks are also lined with insulation or made entirely of rigid insulating material such as asbestos cloth impregnated with phenolic resin.

It is contemplated that a motor, such as shown in FIGURE 5, will be built of such size as to make it possible for a man to work in each successive compartment and to carry out such operations as welding, bonding and applying insulation.

To permit exit and entry, a manhole of adequate diameter can be provided in the center of each tray, which, upon completion of work in the compartment, is sealed from below by closure 109.

Figure 9:
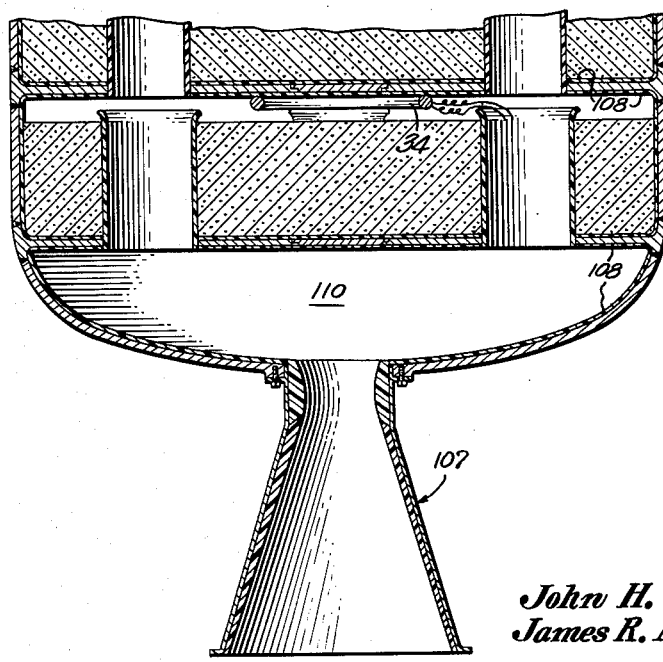
FIGURE 9 is a fragmentary longitudinal sectional view through a modified motor.

Use of the aft motor closure as a receptacle base for supporting a pool of the monopropellant is a weight-saving expedient, which is, however, not essential. The situation can arise where the motor design may require that the number of venting nozzles be different from the number of longitudinal stack series. This can be readily accomplished as shown in FIGURE 9 by providing an aft plenum 110 which communicates with the stacks and which, in turn, vents into the rear nozzle or nozzles.

Another modification which can be employed in special cases, as, for example, where the extra weight of a rear plenum would otherwise be required, is shown in FIGURE 10 in which a plurality of circumferentially-spaced, rearwardly-directed venting nozzles 120 are mounted laterally on the forward end of motor casing 121; which in this case is not segmented but provides for interior support of partitioning member 122 by annular bracket 123. Rear closure 124 provides a base for receiving the monopropellant. The aft receptacle, in this case, does not require an exhaust stack, but vents the combustion gases produced therein through exhaust stack 125 into the upper portion of the forward chamber defined at its forward end by forward closure 126, and out through nozzles 120. The interior surfaces of the motor and partitioning member are lined with insulation 127.

Instead of the plurality of circumferentially-spaced, laterally-mounted nozzles shown in FIGURE 10, a rearwardly-directed, conventional annular plug nozzle can be mounted on the forward end of the motor casing, with the motor casing, suitably insulated and contoured, serving as the plug. The annular orifice of the plug nozzle can be formed by a rearward overhanging extension of the forward motor closure.

As aforementioned, the semi-solid monopropellants are viscous, thixotropic compositions which flow at normal temperatures under stress or pressure, including the pressure of their own weight. Flow may be relatively slow in some formulations because of the high viscosity, but, given adequate time, such as an hour or so, the monopropellant will flow into a continuous mass in its receptacle. This process can be hastened by expedients such as the heating aforedescribed or vibration. Preferably the monopropellant has good cohesive properties. Cohesive strength is closely related to tensile strength. In general, the minimum desirable tensile strength of the material is about 0.01 p.s.i. and preferably about 0.03 p.s.i.

Such semi-solid, gas-generating monopropellants of a large variety of chemical compositions are known in the art. It should be noted that this invention is concerned primarily with the physical characteristics of such monopropellants and not with any specific chemical formulation.

Many different semi-solid monopropellent compositions tailored to different performance requirements can be made having the aforedescribed physical characteristics. The monopropellent composition can, for example, be a double-base type propellant, such as nitroglycerine gelled to the proper semi-solid consistency by solution therein of nitrocellulose. Generally, it will comprise a stable dispersion of a finely-divided, insoluble oxidizer in a continuous matrix of an oxidizable liquid fuel which burns to produce large quantities of high energy combustion gases.

The liquid fuel can be any oxidizable liquid, preferably a high-boiling organic liquid containing carbon and hydrogen. Suitable liquid fuels include hydrocarbons, such as triethyl benzene, dodecane, liquid polyisobutylene, and the like; compounds containing oxygen linked to a carbon atom, as, for example, esters, like dimethyl maleate, diethyl phthalate, dibutyl oxalate, and the like; alcohols, such as benzyl alcohol, triethylene glycol and the like; ethers such as methyl-naphthyl ether and the like; and many others.

The solid oxidizer can be any suitable, active oxidizing agent which readily yields an oxidizing element such as oxygen, chlorine, or fluorine for combustion of the fuel and which is insoluble in the liquid fuel vehicle. Such oxidizers include inorganic oxidizing salts, such as ammonium, sodium and potassium perchlorate or nitrate and metal peroxides such as barium peroxide.

The amount of solid oxidizer incorporated varies, of course, with the particular kind and concentration of fuel components in the formulation, the particular oxidizer, and the specific requirements for a given use, in terms, for example, of required heat release and rate of gas generation, and can readily be computed by those skilled in the art. Since the liquid vehicle can, in many instances, be loaded with as high as 80 to 90% of finely-divided solids, stoichiometric oxidizer levels with respect to the fuel components can generally be achieved when desired, as, for example, in rocket applications where maximum heat release and specific impulse are of prime importance, although in some applications, stoichiometric oxidation levels may not be necessary or even desirable. Sufficient oxidizer must, of course, be incorporated to maintain active, gas-generating combustion.

Finely-divided, solid metal powders such as aluminum or magnesium, in sizes up to about 50 microns, can be incorporated in the monopropellant composition as an additional fuel component along with the liquid fuel. Such metal powders possess the advantages both of increasing the fuel density and improving the specific impulse of the monopropellant because of their high heats of combustion.

The physical properties of the plastic monopropellant in terms of cohesiveness, tensile strength and thixotropy, can be improved by addition of a gelling agent, such as an organic polymer, e.g. polyvinyl chloride, polyvinyl acetate, cellulose acetate, ethyl cellulose; or metal salts of higher fatty acids, such as the sodium or magnesium stearates or palmitates. The desired physical properties can also be obtained without a gelling agent by using a liquid vehicle of substantial intrinsic viscosity, such as liquid organic polymers, e.g. liquid polyisobutylene, liquid siloxanes, liquid polyesters, and the like.

Where a gelling agent is employed to improve the thixotropy and stability of the monopropellant composition, it should be completely dissolved or colloided in the final mix so that there will be no further gelation or increase in viscosity of the monopropellant during storage.

Because of their semi-fluidity, the monopropellants are amenable to the incorporation of many high-energy components, both liquid and solid, which cannot readily be incorporated into a solid propellant grain.

It will be apparent from the foregoing discussion and description that the semi-solid propellant rocket motors of the invention have significant advantages over solid propellant rockets, particularly for large booster application. Among these advantages are:

(1) Propellant cost reduction due to elimination of mold or motor preparation, highly controlled grain casting, grain curing, and grain and motor inspection.

(2) Freedom from cracking in storage, handling, temperature cycling, or during burning.

(3) Superior on-site loading characteristics.

(4) Reduction of quality control complexity and post-loading inspection.

(5) Long, instant-readiness, standby capability without environmental control.

(6) Simplified logistics permitted by semi-solid propellant manufacture at optimum plant location, with tank car distribution to launching sites.

(7) Significant simplification in the application of new ingredients to up-grade motor performance through increased specific and volumetric impulse. For example, high-performance ingredients now being synthesized as liquids or pastes can be incorporated into semi-solid formulations with much less development time and cost than will be required by their use in cured propellants.

We claim:

1. A rocket motor for burning a semi-solid monopropellant, comprising a casing having a closure across its forward end, a closure across its rearward end, at least one transverse partitioning member which divides the interior of said casing into a plurality of chambers for receiving semi-solid monopropellant when said motor is in upright position, said partitioning member having at least one forwardly-extending tubular member opening therethrough, said tubular member terminating at its forward end at a point spaced rearwardly of the forward wall of the chamber in which said tubular member is seated, and opening rearwardly into the forward portion of the next adjacent rearward chamber, and at least one rearwardly-directed nozzle means for venting the combustion gases produced by burning of said semi-solid monopropellant out of said rocket motor, said nozzle means being in open communication with said tubular member.

2. The rocket motor of claim 1 in which said nozzle means is mounted on the rear closure member of said motor.

3. The rocket motor of claim 2 in which the chamber rearward of the rearmost partitioning member is defined rearwardly by the rear closure of said motor, said chamber containing seated therein at least one tubular member, said tubular member extending forwardly from said rear closure member to a point spaced rearwardly from said partitioning member and opening rearwardly through said rear closure into said nozzle means.

4. The rocket motor of claim 1 in which said nozzle means is mounted laterally adjacent to the forward end of said casing.

5. The rocket motor of claim 4 in which the nozzle means comprises a plurality of circumferentially spaced nozzles.

6. A rocket motor for burning a semi-solid propellant, comprising a casing having a closure member across its forward end, a transverse partitioning which divides the interior of said casing into a forward and rearward chamber, each of which forms a receptacle for receiving semi-solid propellant when said motor is in upright position, said partitioning member having at least one forwardly-extending tubular member opening therethrough, said tubular member terminating at its forward end at a point spaced rearwardly of the front wall of said forward chamber and opening rearwardly into the forward portion of said rearward chamber; and at least one rearwardly directed nozzle means for venting the combustion gases produced by burning of said semi-solid propellant out of said rocket motor, said nozzle means being in open communication with said tubular member and said forward portion of said rearward chamber.

7. A rocket motor for burning a semi-solid propellant, comprising a casing having a closure across its forward end; a transverse partitioning member which divides the interior of said casing into a forward and a rearward chamber, said partitioning member having at least one, forwardly-extending, tubular member opening therethrough, said tubular member terminating at its forward end at a point spaced rearwardly from said forward closure member and opening rearwardly into the forward portion of said rearward chamber, said partitioning member being joined with said casing and said tubular member to form the rearward portion of said forward chamber into a receptacle for receiving a semi-solid propellant when said rocket motor is in substantially upright position, said rearward chamber also forming a receptacle for said propellant when said rocket motor is in substantially upright position; and at least one rearwardly-directed nozzle means for venting the combustion gases produced by burning of said semi-solid propellant out of said rocket motor and thereby to produce thrust, said nozzle means being in open communication with said tubular member and said forward portion of said rearward chamber.

8. A rocket motor for burning a semi-solid monopropellant, comprising a casing having a closure across its forward end, a closure across its rearward end, a plurality of longitudinally spaced, transverse partitioning members which divide the interior of said casing into a plurality of chambers for receiving semi-solid monopropellant when said motor is in upright position, each chamber having a forward wall and a rearward wall, said partitioning members each having at least one forwardly-extending tubular member opening therethrough, said tubular member terminating at its forward end at a point spaced rearwardly of the forward wall of the chamber in which said tubular member is seated, and opening rearwardly into the forward portion of the next adjacent rearward chamber; and at least one rearwardly-directed nozzle means for venting the combustion gases produced by burning of said semi-solid monopropellant out of said rocket motor, said nozzle means being in open communication with each of said tubular members.

9. The rocket motor of claim 8 in which the tubular members opening through the several partitioning members are axially aligned.

10. The rocket motor of claim 8 in which said nozzle means is mounted on the rear closure member of said motor.

11. The rocket motor of claim 10 in which the chamber rearward of the rearmost partitioning member is defined rearwardly by the rear closure of said motor, said chamber containing seated therein at least one tubular member, said tubular member extending forwardly from said rear closure to a point spaced rearwardly from said partitioning member and opening rearwardly through said rear closure into said nozzle means.

12. The rocket motor of claim 10 in which the chamber rearward of the rearmost partitioning member defines a plenum which is in open communication with said nozzle means.

13. The rocket motor of claim 8 in which said nozzle means is mounted laterally adjacent to the forward end of said casing.

14. The rocket motor of claim 13 in which the nozzle means comprises a plurality of circumferentially spaced nozzles.

References Cited in the file of this patent

UNITED STATES PATENTS

| | | |
|---|---|---|
| 826,293 | Unge | July 17, 1906 |
| 1,879,579 | Stolfa et al. | Sept. 27, 1932 |
| 2,114,214 | Damblanc | Apr. 12, 1938 |
| 2,814,179 | Edelman et al. | Nov. 26, 1957 |
| 2,816,721 | Taylor | Dec. 17, 1957 |
| 2,971,097 | Corbett | Feb. 7, 1961 |
| 2,988,879 | Wise | June 20, 1961 |